(12) United States Patent
Olander et al.

(10) Patent No.: US 7,913,482 B2
(45) Date of Patent: Mar. 29, 2011

(54) BALE SHAPE MONITOR FOR ROUND BALERS

(75) Inventors: Brian D. Olander, Hesston, KS (US); Robert J. Waggoner, Hesston, KS (US)

(73) Assignee: ACCO Corporation, Duluth, GA (US)

( * ) Notice: Subject to any disclaimer, the term of this patent is extended or adjusted under 35 U.S.C. 154(b) by 1204 days.

(21) Appl. No.: 11/548,338

(22) Filed: Oct. 11, 2006

(65) Prior Publication Data
US 2008/0087177 A1     Apr. 17, 2008

(51) Int. Cl.
  *A01D 39/00*   (2006.01)
  *B65B 57/10*   (2006.01)
(52) U.S. Cl. .................. 56/341; 100/4; 100/88
(58) Field of Classification Search .......... 56/341; 100/3, 4, 88, 89
  See application file for complete search history.

(56) References Cited

U.S. PATENT DOCUMENTS

| | | | | |
|---|---|---|---|---|
| 1,677,942 | A * | 7/1928 | Whitmore | 362/240 |
| 3,103,654 | A * | 9/1963 | Long | 318/490 |
| 4,224,867 | A * | 9/1980 | Gaeddert et al. | 100/88 |
| 4,517,795 | A * | 5/1985 | Meiers | 56/341 |
| 4,850,271 | A | 7/1989 | White et al. | |
| 4,855,924 | A * | 8/1989 | Strosser et al. | 700/117 |
| 4,924,405 | A * | 5/1990 | Strosser et al. | 700/17 |
| 5,551,218 | A * | 9/1996 | Henderson et al. | 53/504 |
| 5,815,072 | A * | 9/1998 | Yamanaka et al. | 340/461 |
| H1819 | H | 12/1999 | Anderson et al. | |
| 6,786,143 | B2 * | 9/2004 | Leupe et al. | 100/4 |
| 6,874,412 | B1 * | 4/2005 | Glaszcz et al. | 100/47 |
| 7,222,566 | B2 * | 5/2007 | Biziorek | 100/87 |
| 2002/0029542 | A1 * | 3/2002 | Davis et al. | 53/399 |
| 2006/0046799 | A1 * | 3/2006 | Brune | 460/2 |
| 2006/0048654 | A1 * | 3/2006 | Biziorek | 100/87 |
| 2007/0175198 | A1 * | 8/2007 | Viaud et al. | 56/341 |

* cited by examiner

*Primary Examiner* — Thomas B Will
*Assistant Examiner* — Joan D Misa

(57) ABSTRACT

A bale shape monitor for assisting an operator of a round baler. The bale shape monitor has an indicator with variable sensitivity. The indicator is less sensitive for small bales and more sensitive for larger bales so that the indicator de-emphasizes bale shape problems at the beginning of bale formation and emphasizes bale shape problems when the bale is almost fully formed. The indicator also changes colors according to the degree the bale is misshapen and provides textual driving instructions.

17 Claims, 6 Drawing Sheets

BALE SHAPE MONITOR FOR ROUND BALERS

BACKGROUND OF THE INVENTION

1. Field of the Invention

The present invention relates to round balers and other baling equipment. More particularly, the invention relates to a bale shape monitor for round balers that assists an operator in forming uniform bales of crop.

2. Description of the Prior Art

Conventional round balers pick-up crop from a windrow and form it into compacted bales in a bale forming chamber. When a bale reaches a desired size and/or shape, sensors signal a controller that subsequently sends a signal to an operator's panel to instruct the operator to stop forward motion of the baler so that a bale wrapping operation can be performed. Once a bale has been formed and wrapped, it is ejected from the baler so a new bale can be formed and wrapped.

In most instances, the crop windrow picked up by a round baler tends to be narrower than the overall length of the baling chamber. The baler must consequently be steered left and right as it pulled across the field so an equal amount of crop material is delivered along the length of the chamber during the bale cycle; otherwise, the baler will likely form an asymmetrical bale having an uneven diameter from end to end. For example, if the baler is positioned relative to the windrow so that a disproportionate amount of crop is delivered to the left end of the baling chamber, the bale will likely have a conical shape, with the left end of the bale having a greater diameter and density than the right end. Nonuniform bale formation results in unsightly bales that are difficult to sell, stack and tie. Moreover, nonuniform bale formation often damages or places undue wear on the bale forming components.

Even the most skilled baler operator has difficultly in tediously weaving the baler from side to side for ensuring even delivery of crop material between the sidewalls of the baler. Accordingly, bale shape monitors have been developed to assist the operator with uniform bale formation. Conventional bale shape monitors typically include indicators placed within the cab of the tractor to signal to the operator when the bale is not being properly shaped. Traditional indicators include bale shape displays which represent the shape of the bale from end-to-end or at certain locations along the length of the bale. Some indicators also include "driving lights" which signal to the operator when to steer left, steer right or simply drive forward. Additionally, some balers have been equipped with a steering mechanism for automatically steering the baler left and right in response to the bale shape sensed by the monitor.

The indicators mentioned above are traditionally operated by one or more sensors on the baler. In round balers having an expandable baling chamber defined in part by a plurality of endless belts, the sensors are often associated with the endless belts adjacent the sidewalls of the baler. Each end sensor is often positioned along a stretch of the corresponding belt to detect when the stretch becomes slackened or tightened. The belts are traditionally tensioned by a single slack takeup mechanism, and accordingly, slackening of one of the belts relative to the remaining belts indicates that the area of the baling chamber bound by the one belt is receiving less crop material than the others. Alternatively, the end sensors are positioned along stretches of the belts defining the baling chamber so as to directly sense the diameter of the bale. The operator may consequently steer the baler left or right depending upon the diameter of the bale sensed adjacent the ends thereof.

Known bale shape monitors suffer from several limitations. For example, existing bale shape monitors have indicators that are too sensitive to non-uniform bales when the bales are relatively small and aren't sensitive enough when the bales are almost fully formed. This is because it takes a smaller amount of crop to change the shape of a bale when the bale is small and a much larger amount of crop to change the shape when the bale is nearly fully formed. The indicators therefore "jump around" when the bale is small, because a small amount of crop can quickly make one end of the bale relatively larger than the other end, causing the bale shape indicators to change rapidly and thus prompting the operator to needlessly weave the baler back and forth at a high frequency. Just as seriously, the indicators don't signal an uneven bale quickly enough when the bale is nearly fully formed, causing many bales to reach full size before the operator can make necessary driving adjustments.

Known bale shape monitors also typically present information about uneven bales in black and white text and/or graphs that fail to get the operator's attention quickly enough.

Accordingly, there is a need for an improved bale shape monitor that overcomes the limitations of the prior art.

SUMMARY OF THE INVENTION

The present invention solves the above-described problems and provides a distinct advance in the art of bale shape monitors for round balers and other baling equipment. More particularly, the present invention provides a bale shape monitor with a bale shape indicator having variable sensitivity. In one embodiment, the indicator is less sensitive for small bales and more sensitive for larger bales so that the indicator de-emphasizes bale shape problems at the beginning of bale formation and emphasizes bale shape problems when the bale is almost fully formed. This prevents the bale shape indicator from changing rapidly, or jumping around, at the beginning of a bale forming operation, and provides the operator more immediate notice of uneven bales when the bales are almost fully formed.

In accordance with another important aspect of the present invention, the bale shape monitor has a bale shape indicator that changes colors according to the degree a bale is misshapen. In one embodiment, the indicator includes three bars for representing the diameter of the left side, center, and right side of a bale. When the three bars are all within a certain size of one another (and therefore the bale is relatively even) all three bars may be colored green. However, if the middle, left, or right sides of the bale deviate in size from at least one other portion of the bale by a first threshold, one or more of the bars may be colored yellow, and if a portion of the bale deviates in size by a second, larger threshold, one or more of the bars may be colored red. The bale shape monitor may also display textual instructions such as "Fill Right" or "Fill Center" to assist the operator.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figure 1:
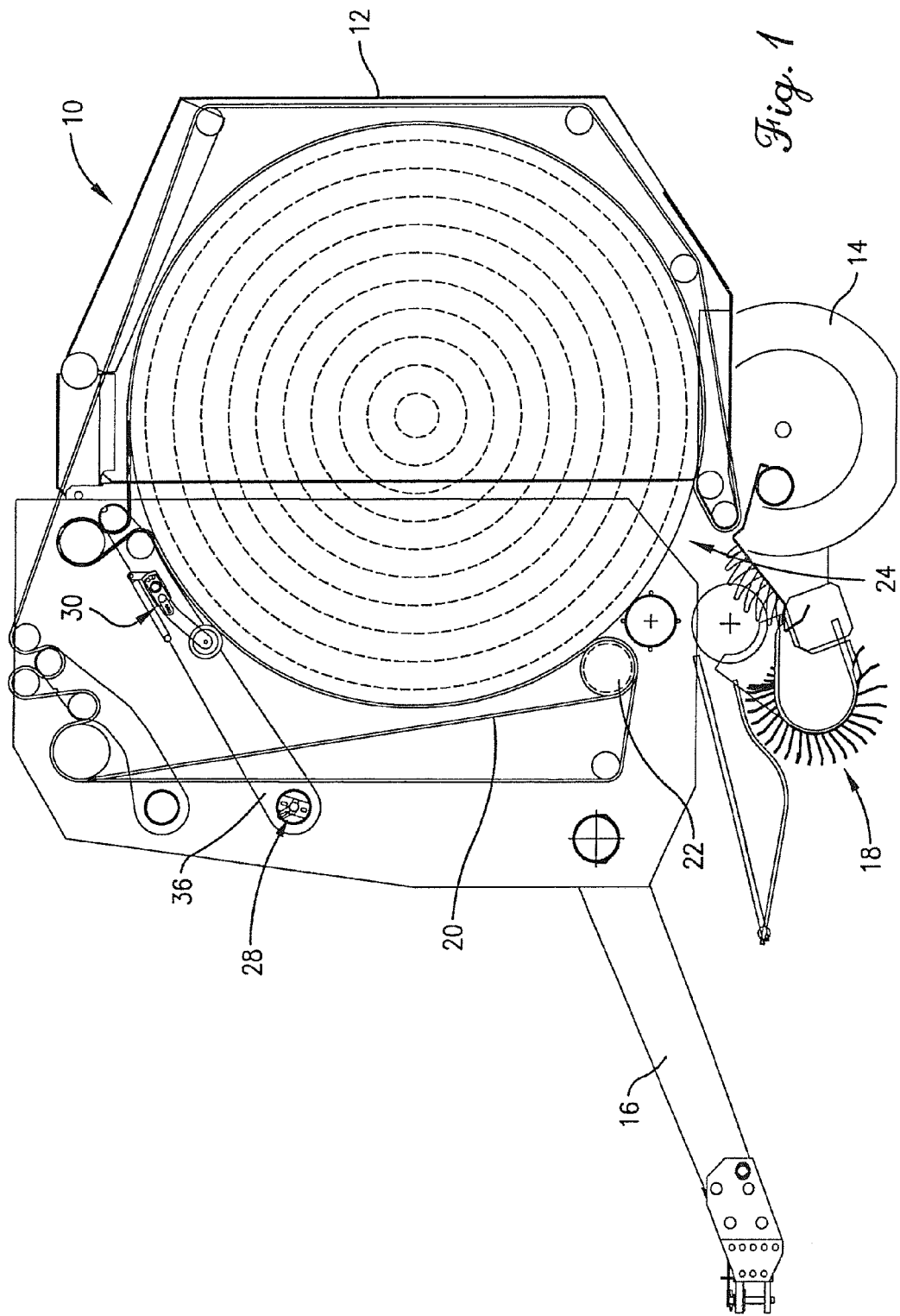
FIG. 1 is a schematic, side elevational illustration of a rotary baler with a near sidewall thereof removed to reveal mechanisms within the baler.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

The present invention is preferably incorporated as part of a round baler 10 such as the 900 series round balers manufactured by Agco Corporation including the Hesston 945, 955, 956, 946A, 956A, New Idea 6454, 6464, 6465, and Challenger RB45, RB46 and RB56 round balers; however, the invention may be incorporated as a part of other types of baling equipment such as fixed chamber balers, square balers, etc. Referring to FIG. 1, the preferred baler 10 includes a pair of laterally spaced apart sidewalls 12 (only one being shown) carried by ground wheels 14 (only one being shown) for advancement across a field in response to pulling force supplied to a generally fore-and-aft extending tongue 16 at the front of the sidewalls. A suitable power transmission device (not shown) incorporated as part of baler 10 is normally connected to the power-take off shaft of a tractor or other vehicle towing baler 10 for thereby supplying driving power to the various moving components of baler 10 including a crop pickup 18 thereof which may be of conventional design.

Because the sidewalls are laterally spaced-apart respective to the normal path of travel of the baler 10, room is provided therebetween for formation and transport of a bale of crop formed by material which is picked up and loaded into the space between the sidewalls by pickup 18. Hence, the sidewalls cooperate in part to define a baling chamber. The fore-and-aft limitations of the baling chamber are defined by opposed, initially generally vertically disposed stretches of an endless, flexible web means broadly denoted by the numeral 20 and preferably comprising a series of endless, side-by-side, flexible rubber belt elements having their respective longitudinal axes disposed in a plane parallel to the sidewalls.

The endless belts 20 are looped around a number of cylindrical rolls spanning the distance between the sidewalls. For example, a roll 22 adjacent the lower front end of baling chamber may be driven by the output of the power transmission mechanism so as to provide motive force for driving the endless belts 20 longitudinally of themselves. The other rolls may be idlers. The bottom of the baling chamber is open to present a crop inlet 24 for the pickup 18.

The round baler 10 also includes a twine dispensing arm which dispenses twine or other wrapping material for wrapping bales formed in the bale forming chamber. The twine dispensing arm preferably has two twine tubes and is pivotally mounted to a pivot point at the front of the baler 10. The twine dispensing arm is mechanically controlled by a linear actuator coupled to the arm by a drive chain and sprocket. When the actuator retracts, the end of the twine arm moves to the right side of the baler. When the actuator extends, the twine arm moves to the left side of the baler.

Figure 2:
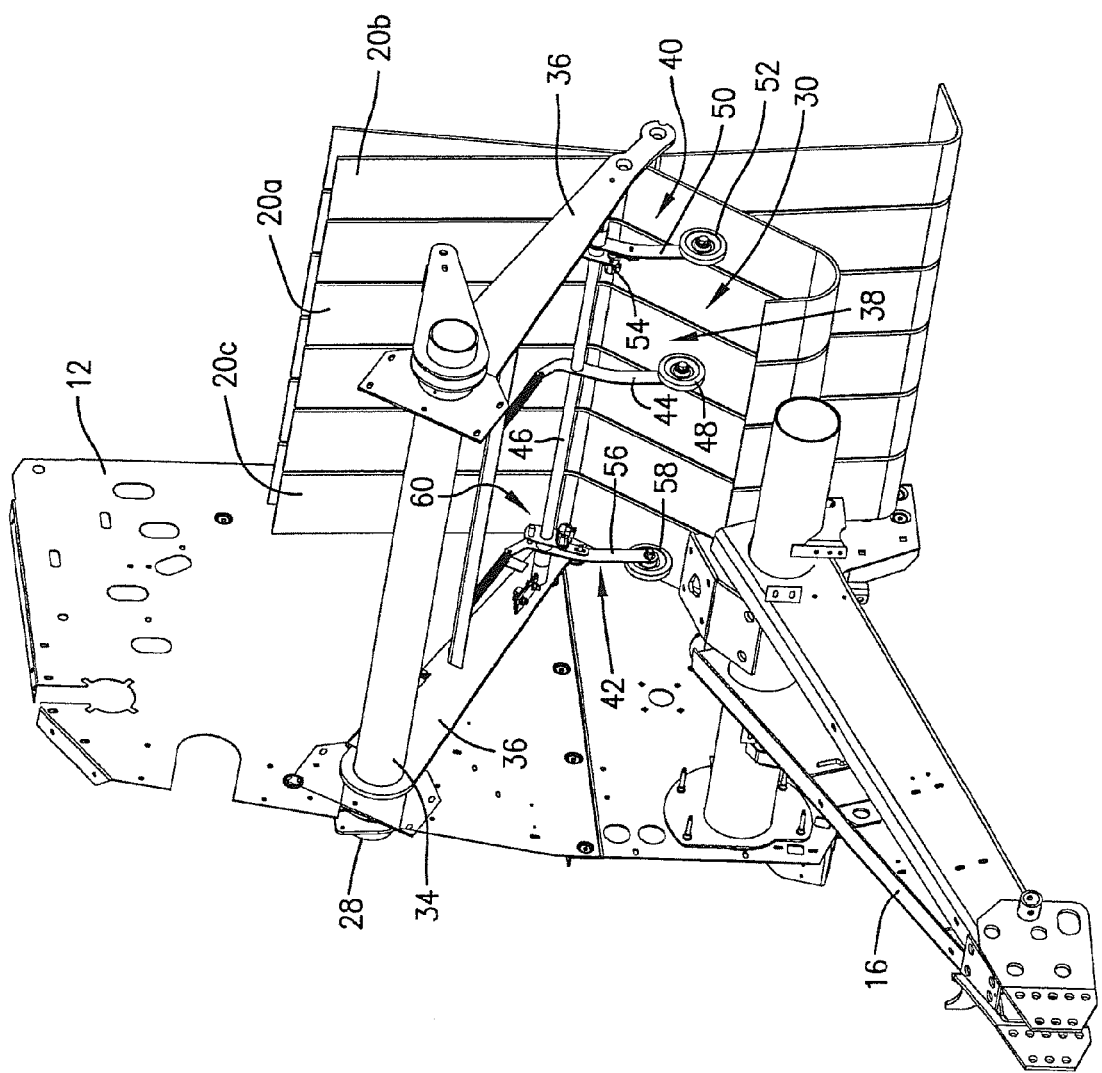
FIG. 2 is a schematic, isometric illustration of some of the internal mechanisms of the baler.
Figure 3:
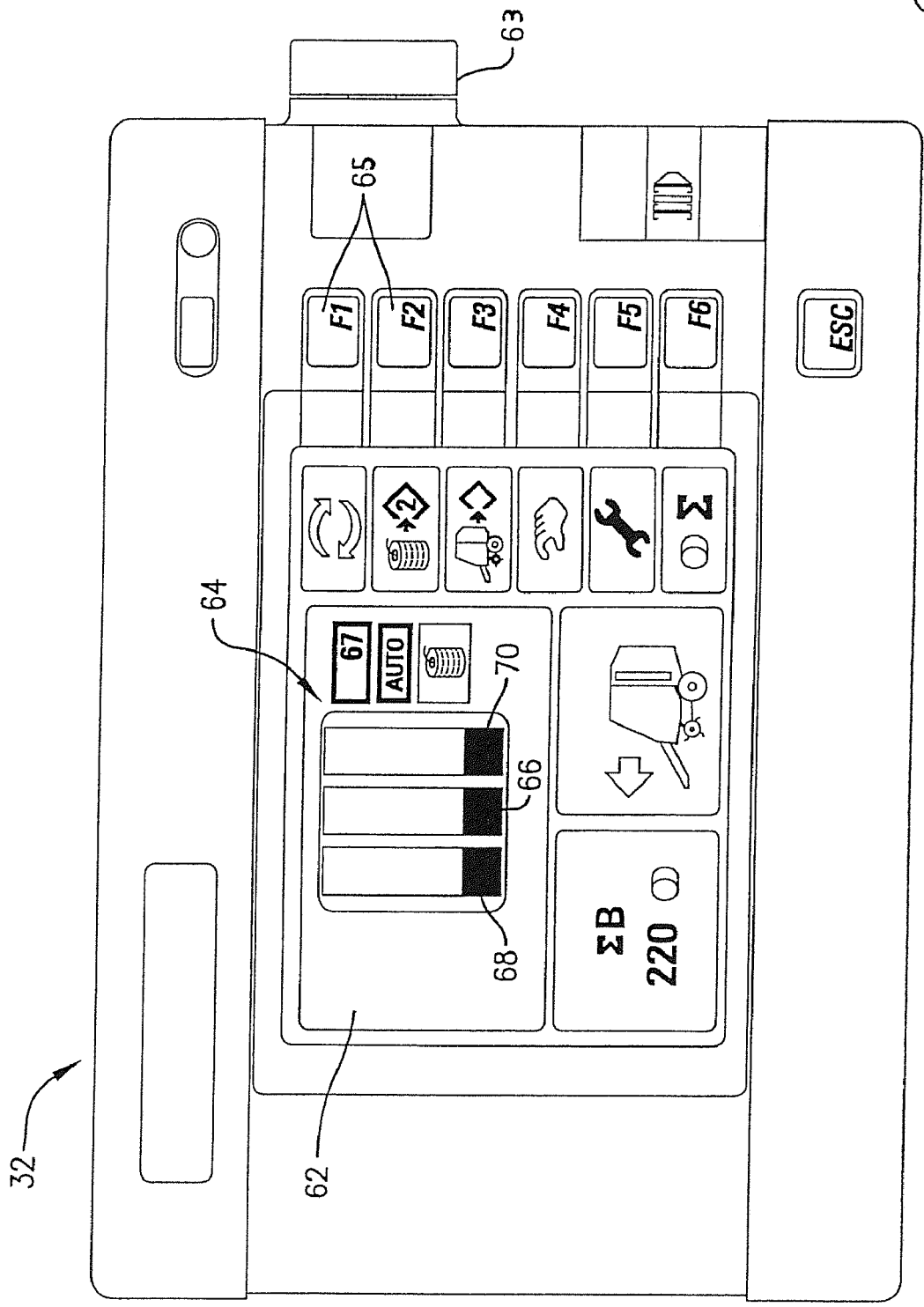
FIG. 3 is a schematic illustration of a user interface of the bale shape monitor.
Figure 4:
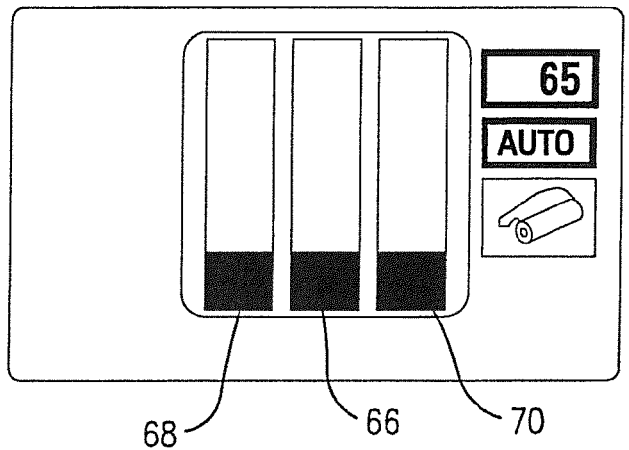
FIG. 4 is a sample screen display of the user interface.
Figure 5:
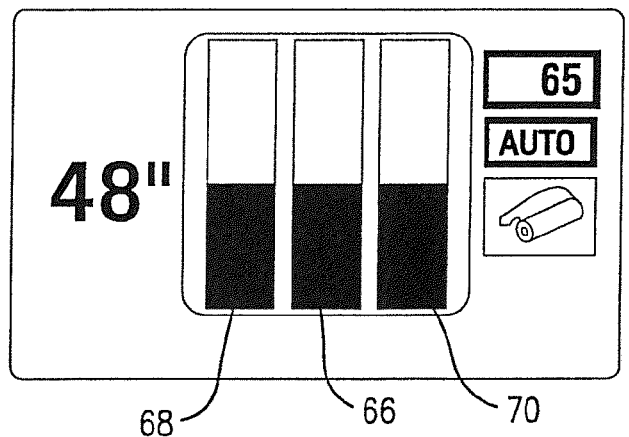
FIG. 5 is another sample screen display of the user interface.

The baler 10 also includes a bale shape monitor for assisting the operator in forming uniform bales of crop. As best illustrated in FIGS. 2 and 3, the bale shape monitor preferably includes a bale size sensor 28, a bale shape sensor assembly 30, and a user interface 32.

The bale size sensor 28 is preferably a rotary hall-effect sensor such as those manufactured by Power Components in Mishawaka, Ind. The bale size sensor 28 includes a rotation element which is coaxially mounted to one end of a mounting shaft 34 for belt tensioning arms 36 to produce an output signal corresponding to the rotational position of the shaft 34, which position is representative of the size of the bale being formed in the baling chamber. The output signal of the bale size sensor 28 preferably has a range of 1-4V.

The bale shape sensor assembly 30 includes a center reference assembly 38, a left side sensor assembly 40, and a right side sensor assembly 42. The center reference assembly 38 includes a center arm 44 swingably mounted within the baler by a transverse bar 46. The center arm 44 is welded or otherwise fixed to the bar 46. The ends of the bar 46 are rotatably supported to the belt tensioning arms 36 by bearing supports. A feeler wheel 48, formed of rubber or other suitable material, is mounted to one end of the center arm 44 by a nut and bolt assembly. A bearing assembly within the wheel serves to journal the wheel on the nut and bolt assembly. The center arm 44 is positioned so that its feeler wheel 48 rides against the exterior surface of one of the centermost belts 20a. The wheel 48 is yieldably biased against the belt 20a by tension springs. The center reference assembly 38 does not include its own active bale size sensor, but instead serves as a reference for the left side and right side sensors as described below.

The left side sensor assembly 40 also includes a swingable arm 50 and a rotatable wheel 52 mounted adjacent one end of the arm by a nut-and-bolt assembly for relative rotational movement by a bearing assembly (not shown) contained within the wheel. Fixed to the opposite end of the arm 50 is a cylindrical collar for supporting the arm 50 on the bar 46. The collar loosely receives the bar so as to allow relative movement therebetween. The wheel 52 is yieldably pressed against the front stretch of the leftmost belt 20b by a tension spring. The location of the collar along the length of the bar is maintained so that the wheel presses against the leftmost belt at a point spaced equally between the sides of the belt.

The left side sensor assembly 40 also includes a bale shape sensor 54, including a signal sender mounted to the bar 46 and an actuator rod mounted to the arm 50. The bale shape sensor 54 senses the relative difference in the bale diameter at the left side of the bale versus the center by sensing differences in the tension of the leftmost belt 20b versus the center belt 20a. Relative tension can be sensed because the signal sender is mounted to the bar 46, which moves with the center arm 44, whereas the actuator rod is mounted to the left arm 50, which can move independently of the center arm 44 and bar 46. When the tension on the left 20b and center 20a belts is the same, the signal sender and actuator rod rotate together so that the output signal of the signal sender doesn't change. However, if the tension on the left belt 20b is more or less than the tension on the center belt 20a, the actuator rod will rotate one direction or the other relative to the signal sender to cause the signal sender's output signal to increase or decrease a proportional amount.

The signal sender preferably has an output signal range of 4 Volts. The signal sender and actuator rod are preferably installed and calibrated so that an output signal of 1V means the leftmost belt 20b is in its most slackened position relative to the center belt 20a, an output signal of 2.5V means the leftmost belt is under the same tension as the center belt, and an output signal of 4V means the leftmost belt is in its highest tension relative to the center belt.

The right side sensor assembly 42 is structurally and functionally similar to the left side sensor assembly 40, and includes a swingable arm 56, a rotatable wheel 58 supported on the bar 46, and a bale shape sensor 60. The wheel 58 is yieldably pressed against a rightmost belt 20c.

The bale shape sensor 60 includes a signal sender mounted to the bar 46 and an actuator rod mounted to the arm 56. The bale shape sensor senses the relative difference in the bale diameter at the right side of the bale versus the center by sensing differences in the tension of the rightmost belt 20c versus the center belt 20a as described above with respect to the left side sensor assembly.

The signal sender for the right side sensor assembly preferably has an output signal range of 4 Volts. The bale shape sensor is preferably installed and calibrated so that an output signal of 4V means the rightmost belt 20c is in its most slackened position relative to the center belt 20a, an output signal of 2.5V means the rightmost belt is under the same tension as the center belt, and a signal output of 1V means the rightmost belt is in its highest tension relative to the center belt.

It will be appreciated that the left and right side sensor assemblies 40, 42 are not necessarily limited to being associated with the endmost belts of the baler. In some baler constructions, it may be sufficient to associate the sensor assemblies 40, 42 with a belt that is only proximate to the adjacent baler sidewall. For example, the bale diameter may be sufficiently detected by associating the sensor assemblies with a belt spaced inwardly from one or more of the other belts. Furthermore, it is entirely within the scope of the present invention to utilize a pair of left and right side sensors and an intermediate sensor such as described in United States Statutory Invention Registration No. H1,819, hereby incorporated into the present application by reference.

The user interface 32 receives inputs from an operator of the tractor. An external control device or other computing device connection to the user interface receives output signals from the bale size sensor 28 and the left and right side bale shape sensors 54, 60. The user interface 32 is preferably compatible with ISO 11783 standards so that it can be used to control operation of any implement used with the tractor or other towing vehicle. The user interface 32 is programmed with a computer program comprising an ordered listing of executable instructions for implementing logical functions of the user interface 32. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

As best illustrated in FIG. 3, a preferred embodiment of the user interface 32 includes a display screen 62, a control knob 63, a plurality of function keys 65 or other inputs, and an internal controller, processor or other control device. The user interface 32 is preferably connected to the tractor key switch so that it automatically turns on when the tractor key is used to start the tractor. The control knob 63 allows the operator to scroll through the functions shown on the display screen and select one of the functions when the knob is pressed. The function keys 65 enable a displayed function or cause display of another screen. The particular operation or function of each function key is determined by software and can be changed.

Other details of round balers which may be used with the present invention are described in U.S. Pat. Nos. 6,477,824; 6,675,561; 4,850,271; and 4,224,867, all incorporated into the present application by reference.

Operation

To begin a bale-forming operation, an operator pulls the baler 10 across a windrow with a tractor or other vehicle in a conventional manner. As crop material is added to the bale forming chamber, the belts 20 stretch to accommodate the ever-increasing size of the bale. The bale shape monitor monitors the size and shape of the bale as it is being formed and provides important feedback to the operator via the display 62 on the user interface 32.

In a preferred embodiment, the display 62 provides a representation of the bale size and shape with a three bar indicator 64 as illustrated in FIGS. 3-11. The middle bar 66 provides an indication of the overall bale size and is driven by the output signal of the bale size sensor 28. For example, a bale size sensor output of 1V, which corresponds to a bale that has just started to form, results in a relatively short middle bar 66. A sensor output of 4V, which corresponds to a bale that is fully formed, results in a relatively a tall middle bar 66.

The left bar 68 provides an indication of the size of the left side of the bale and is driven by an algorithm that takes into account the output signal from the left side sensor assembly 40 and a selected bale shape sensitivity variable. In accordance with one important aspect of the present invention, the user interface 32 is programmed to provide a bale shape display that is less sensitive at small bale sizes and relatively more sensitive at larger bale sizes. For example, when the left side sensor assembly 40 determines that the leftmost belt 20b is slackened relative to the centermost belt 20a, the left bar 68 of the indicator 64 will be slightly shorter than the middle bar 66 when the bale is small, but may be significantly shorter than the middle bar for the same amount of slack when the bale is almost fully formed. This prevents the indicator from "jumping around" when the bale is small (and a relatively small amount of crop can change its diameter) and gives the operator a more exaggerated indication of an uneven bale shape when the bale is nearly full (and the operator needs to quickly make changes before the bale is full size).

Similarly, the right bar 70 of the indicator 64 provides an indication of the size of the right side of the bale and is driven by an algorithm that takes into account the output signal from the right side sensor assembly 42 and a selected bale shape sensitivity variable.

The algorithm which drives the left bar of the display is:

Left Bar Value=Bale Size×(1.0+((1.0−LeftDiff/(EmptyChamber Left Shape Sensor Voltage−Left Limit)−1.0)×SensFactor))

Where:
Bale Size=current size of the bale in the chamber in inches as measured by the bale size sensor.
Left Diff=difference between bale size sensor output and left bale shape sensor output voltages.
Left Limit=lower voltage limit of left bale sensor.
EmptyChamber Left Shape Sensor Voltage=the signal output of the left bale shape sensor when the bale chamber is empty. SensFactor=a variable to make shape bar graphs move more (or less) than "normal" for a given amount of voltage difference.

The following are examples of the algorithm results for different bale shape and size scenarios:

1) The bale is approximately ¼ formed and the left side is bigger than the center.
Bale Size Setting=72"
¼ formed bale=18"
Left Shape Sensor Voltage=3.1V
Bale Size Sensor Voltage=2.6V
Empty Chamber Left Shape Sensor Voltage=2.6V
SensFactor=1.0 (normal sensitivity)
Left Limit=0.5V
LeftBarValue=Bale Size×(1.0+((1.0−LeftDiff/(Empty-Chamber Left Shape Sensor Voltage−Left Limit)−1.0)× SensFactor)) =18×(1+(1−(2.5−3.1)/(2.6−0.5)−1)×1)) = 23 inches Thus, the left bar 68 indicates a left side size of 23" and the middle bar 66 indicates a bale size of 18". For one embodiment, this may result in the left bar being 37% filled and the center bar being 29% filled.

2) The bale is ½ formed and the left side is smaller than the center.
Bale Size Setting=72"
½ formed bale=36"
Left Shape Sensor Voltage=2.6V
Bale Size Sensor Voltage=3.1V
Empty Chamber Left Shape Sensor Voltage=2.6V
SensFactor=1.0 (normal sensitivity)
Left Limit=0.5V
LeftBarValue=Bale Size×(1.0+((1.0−LeftDiff/(Empty-Chamber Left Shape Sensor Voltage−Left Limit)−1.0)× SensFactor)) =36×(1+(1−(3.1−2.6)/(2.6−0.5)−1)×1)) = 27 inches Thus, the left bar 68 indicates a left side size of 27" and the middle bar 66 indicates a bale size of 36". For one embodiment, this may result in the left bar being 40% filled and the center bar being 53% filled.

3) The bale is almost fully formed and the right and/or left sides are smaller than the center.
Bale Size Setting=72"
Almost formed bale=68"
Left Shape Sensor Voltage=3.5V
Bale Size Sensor Voltage=4.0V
Empty Chamber Left Shape Sensor Voltage=2.6V
SensFactor=1.0 (normal sensitivity)
Left Limit=0.5V
LeftBarValue=Bale Size×(1.0+((1.0−LeftDiff/(Empty-Chamber Left Shape Sensor Voltage−Left Limit)−1.0)× SensFactor)) =68×(1+(1−(4.0−3.5)/(2.6−0.5)−1)×1)) = 52 inches Thus, the left bar 68 indicates a left side size of 52" and the middle bar 66 indicates a bale size of 68". For one embodiment, this may result in the left bar being 73% filled and the center bar being 96% filled.

4) The bale is almost fully formed and the right and/or left sides are bigger than the center.
Bale Size Setting=72"
Almost formed bale=68"
Left Shape Sensor Voltage=4.5V
Bale Size Sensor Voltage=4.0V
Empty Chamber Left Shape Sensor Voltage=2.6V
SensFactor=1.0 (normal sensitivity)
Left Limit=0.5V
LeftBarValue=Bale Size×(1.0+((1.0−LeftDiff/(Empty-Chamber Left Shape Sensor Voltage−Left Limit)−1.0)× SensFactor)) =68×(1+(1−(4.0−4.5)/(2.6−0.5)−1)×1)) = 84 inches Thus, the left bar 68 indicates a left side size of 84" and the middle bar 66 indicates a bale size of 68". For one embodiment, this may result in the left bar being 100% filled and the center bar being 96% filled.

As illustrated by the above examples, at an 18" bale size, a 0.5V difference between bale size sensor voltage and left side bale shape sensor voltage results in a difference of 5 inches in representative size of the center and left bars, 66, 68. At a 36" bale size a 0.5V difference results in a difference of 9 inches. At a 68" bale size, a 0.5V difference results in a difference of 16 inches. So as the bale size grows, the same voltage difference produces more bar graph difference between bars 66 and 68. The effect is a more sensitive bar graph display as the bale gets closer to full size.

The above examples include a sensitivity of "normal" in all cases. For a "high" sensitivity setting, the values could be scaled up by 25% or some other amount to further increase the sensitivity of the bar indicator to shape problems. For a "low" sensitivity setting, the values could be scaled down by 25% or some other amount to decrease the sensitivity of the bar indicator to shape problems.

Figure 7:
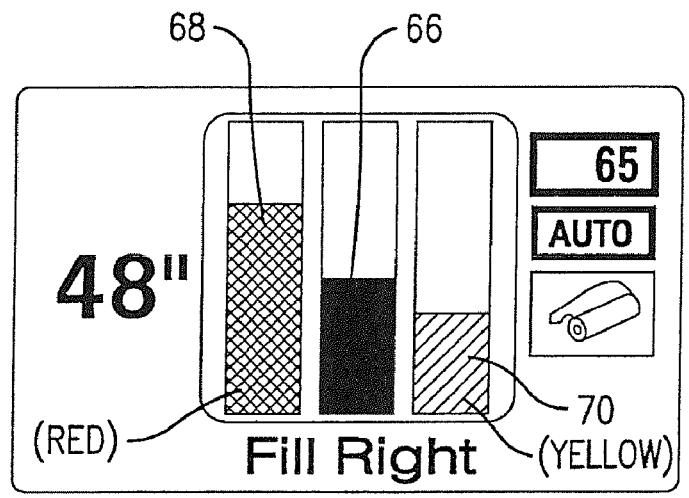
FIG. 7 is yet another sample screen display of the user interface.
Figure 8:
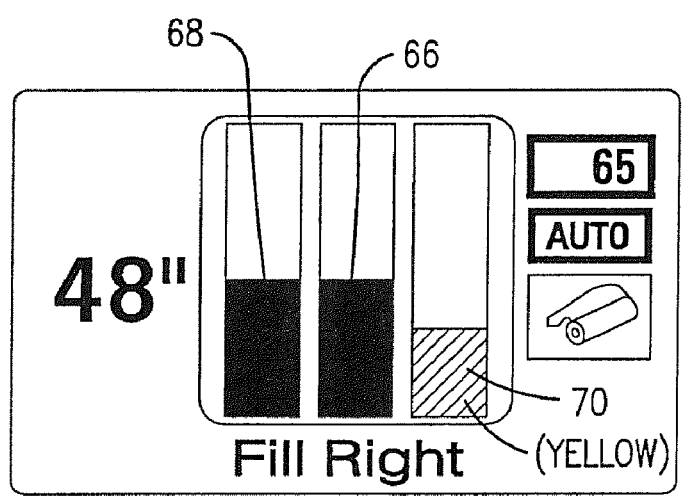
FIG. 8 is yet another sample screen display of the user interface.

In accordance with another important aspect of the present invention, the color of one or more of the bars 66, 68, 70 on the display changes when the bale shape falls outside of certain shape limits. For example, the right bar 70 may turn yellow as depicted in FIG. 8 if the controller determines the right side of the bale is a percentage smaller than the center of the bale. Similarly, the left bar may turn red and the right bar yellow as depicted in FIG. 7 if the left side is a percentage bigger than the center and the right side is a percentage smaller than the center. The left and right bars may also simultaneously turn yellow or red as depicted in FIGS. 10 and 11 if both the left and right sides deviate from the center.

Figure 9:
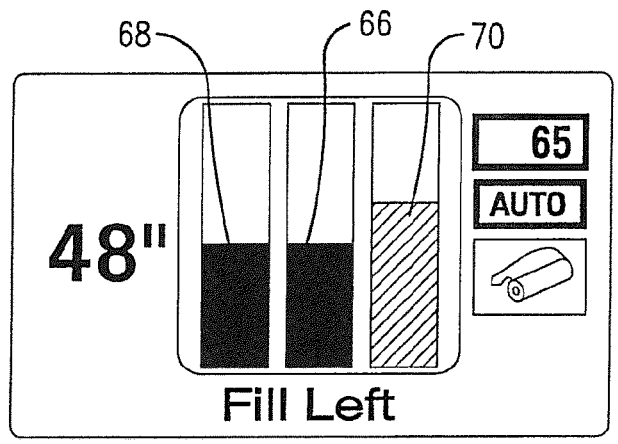
FIG. 9 is yet another sample screen display of the user interface.

The user interface 32 may also provide certain text messages to assist the operator in forming uniformly shaped bales. For example, "Fill Left" may be displayed as depicted in FIG. 9 when the left bar 68 is lower than the right bar 70. "Fill Left" may also be displayed when the right bar is higher than both the middle bar and the left bar.

"Fill Right" may be displayed when the right bar 70 is lower than either the left bar 68 or the middle bar 66 as depicted in FIGS. 7 and 8.

Figure 10:
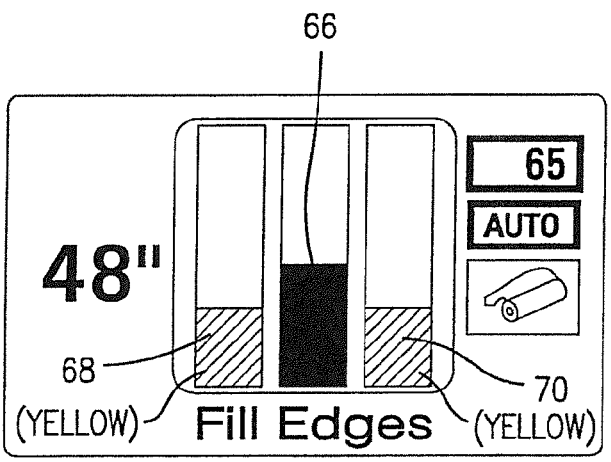
FIG. 10 is yet another sample screen display of the user interface.
Figure 11:
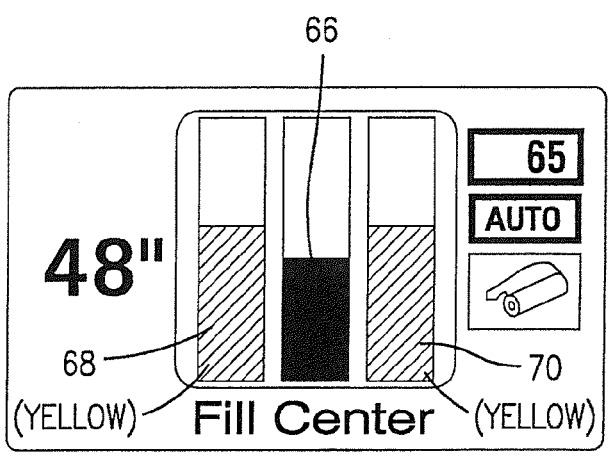
FIG. 11 is yet another sample screen display of the user interface.

"Fill Edges" may be displayed as depicted in FIG. 10 when both the left and right bars 68, 70 are lower than the middle bar 66. "Fill Center" may be displayed as depicted in FIG. 11 when both the left and right bars 68, 70 are higher than the middle bar 66.

"Near Full" may be displayed for 2 seconds when the bale nearly reaches the full bale size limit. "Near Full" display takes priority over bale shape texts for 2 seconds.

Figure 6:
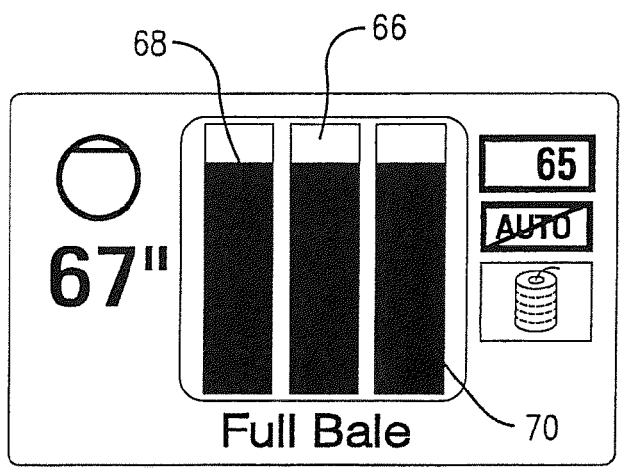
FIG. 6 is yet another sample screen display of the user interface.

"Full Bale" may be displayed as depicted in FIG. 6 when the bale reaches the full bale size limit. "Full Bale" text takes priority over all other texts on the General Text object.

Although the invention has been described with reference to the preferred embodiment illustrated in the attached drawing figures, it is noted that equivalents may be employed and substitutions made herein without departing from the scope of the invention as recited in the claims. For example, although the bale size and shape indicator of the present invention is particularly suited for use with round balers, it may also be used with other baling equipment.

Having thus described the preferred embodiment of the invention, what is claimed as new and desired to be protected by Letters Patent includes the following:

1. A bale shape monitor for use with a baler that forms a bale having a center, a left side, and a right side, the bale shape monitor comprising:
   an indicator including a first portion for indicating a size of the left side of the bale, a second portion for indicating a size of the center of the bale, and a third portion for indicating a size of the right side of the bale; and
   a control device configured for driving the indicator in response to a signal indicative of an overall size of the bale received from a bale size sensor and one or more signals indicative of a size difference between the left side of the bale and the center of the bale or a size difference between the right side of the bale and the center of the bale received from at least one bale shape sensor, the control device being programmed to change a sensitivity of one of the first and third portions of the indicator relative to the second portion of the indicator as the bale increases in size,
   wherein the control device is programmed to calculate the size of the left side of the bale by scaling the overall size of the bale by a factor dependent on the signal indicative of the size difference between the left side of the bale and the center of the bale.

2. The bale shape monitor as set forth in claim 1, wherein the first, second, and third portions of the indicator are bar displays.

3. The bale shape monitor as set forth in claim 1, wherein the control device is further programmed to change a color of one of the first, second, and third portions of the indicator when one of the left side, center, and right side of the bale becomes a pre-determined amount different in size than at least one other portion of the bale.

4. The bale shape monitor as set forth in claim 3, wherein the control device changes one of the first, second, and third portions of the indicator to yellow when one of the left side, center, and right side of the bale becomes a first amount different in size than at least one other portion of the bale.

5. The bale shape monitor as set forth in claim 3, wherein the control device changes one of the first, second, and third portions of the indicator to red when one of the left side, center, and right side of the bale becomes a second amount different in size than at least one other portion of the bale.

6. The bale shape monitor as set forth in claim 1, further comprising:
   the bale size sensor for measuring the overall size of the bale;
   the at least one bale shape sensor comprising:
      a first bale shape sensor for sensing a relative size difference between the left side of the bale and the center of the bale; and
      a second bale shape sensor for sensing a relative size difference between the right side of the bale and the center of the bale;
   wherein the control device is configured to receive signals from the bale size sensor and the first and second bale shape sensors.

7. The baler as set forth in claim 1, wherein the control device displays messages to assist an operator of the baler in correctly filling the baler.

8. The bale shape monitor of claim 1, wherein the size of the center of the bale indicated by the second portion of the indicator is the overall size of the bale.

9. A bale shape monitor for use with a baler that forms a bale having a center, a left side, and a right side, the bale shape monitor comprising:
   an indicator including a first portion for indicating a size of the left side of the bale, a second portion for indicating a size of the center of the bale, and a third portion for indicating a size of the right side of the bale; and
   a control device configured for driving the indicator in response to a signal indicative of an overall size of the bale received from a bale size sensor and one or more signals indicative of a size difference between the left side of the bale and the center of the bale or a size difference between the right side of the bale and the center of the bale received from at least one bale shape sensor, the control device being programmed to change a sensitivity of one of the first and third portions of the indicator relative to the second portion of the indicator as the bale increases in size,
   wherein the control device is programmed to calculate the size of the right side of the bale by scaling the overall size of the bale by a factor dependent on the signal indicative of the size difference between the right side of the bale and the center of the bale.

10. The bale shape monitor as set forth in claim 9, wherein the first, second, and third portions of the indicator are bar displays.

11. The bale shape monitor as set forth in claim 9, wherein the control device is further programmed to change a color of one of the first, second, and third portions of the indicator when one of the left side, center, and right side of the bale becomes a pre-determined amount different in size than at least one other portion of the bale.

12. The bale shape monitor as set forth in claim 11, wherein the control device changes one of the first, second, and third portions of the indicator to yellow when one of the left side, center, and right side of the bale becomes a first amount different in size than at least one other portion of the bale.

13. The bale shape monitor as set forth in claim 11, wherein the control device changes one of the first, second, and third portions of the indicator to red when one of the left side, center, and right side of the bale becomes a second amount different in size than at least one other portion of the bale.

14. The bale shape monitor as set forth in claim 9, further comprising:
   the bale size sensor for measuring the overall size of the bale;
   the at least one bale shape sensor comprising:
      a first bale shape sensor for sensing a relative size difference between the left side of the bale and the center of the bale; and
      a second bale shape sensor for sensing a relative size difference between the right side of the bale and the center of the bale;
   wherein the control device is configured to receive signals from the bale size sensor and the first and second bale shape sensors.

15. The baler as set forth in claim 9, wherein the control device displays messages to assist an operator of the baler in correctly filling the baler.

16. The bale shape monitor of claim 9, wherein the size of the center of the bale indicated by the second portion of the indicator is the overall size of the bale.

17. A bale shape monitor for use with a baler that forms bales, the bale shape monitor comprising:
   a bale size sensor configured to determine and output a signal representative of an overall size of a bale;
   a left side sensor configured to determine and output a signal representative of a diameter difference between a center portion of the bale and a left portion of the bale;
   a right side sensor configured to determine and output a signal representative of a diameter difference between a center portion of the bale and a right portion of the bale;
   a control device configured for receiving the signal representative of the overall size of the bale, the signal output by the left side sensor and the signal output by the right side sensor, wherein the control device is programmed to:
      calculate a size of the left portion of the bale by scaling the overall size of the bale by a factor dependent on the output from the left side sensor, and
      calculate a size of the right portion of the bale by scaling the overall size of the bale by a factor dependent on the output from the right side sensor;
   an indicator in communication with the control device, the indicator including:
      a first portion indicative of the size of the left portion side of the bale calculated by the control device,
      a second portion indicative of the overall size of the bale corresponding with the bale size sensor output, and
      a third portion indicative of the size of the right portion of the bale calculated by the control device.

* * * * *